United States Patent
Morrison, III et al.

(10) Patent No.: US 9,519,574 B2
(45) Date of Patent: Dec. 13, 2016

(54) DYNAMIC CONTENT ACCESS WINDOW LOADING AND UNLOADING

(71) Applicant: MICROSOFT TECHNOLOGY LICENSING, LLC, Redmond, WA (US)

(72) Inventors: Frank R. Morrison, III, Seattle, WA (US); Brandon Hunt, Redmond, WA (US); Alexander Burba, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 164 days.

(21) Appl. No.: 13/687,809

(22) Filed: Nov. 28, 2012

(65) Prior Publication Data

US 2014/0149636 A1    May 29, 2014

(51) Int. Cl.
*G06F 12/02* (2006.01)
*A63F 9/24* (2006.01)
(Continued)

(52) U.S. Cl.
CPC .......... *G06F 12/02* (2013.01); *A63F 9/24* (2013.01); *A63F 13/67* (2014.09); *G06F 3/061* (2013.01); *G06F 3/0608* (2013.01); *G06F 3/0649* (2013.01); *G06F 3/0685* (2013.01); *G06F 12/00* (2013.01); *A63F 2300/206* (2013.01); *A63F 2300/6027* (2013.01); *G06F 12/0862* (2013.01);
(Continued)

(58) Field of Classification Search
CPC ............ G06F 12/0862; G06F 2212/455; G06F 2212/602–2212/6028; G06F 17/3225; A63F 2300/206–2300/208

USPC ............................................. 711/137; 463/43
See application file for complete search history.

(56) References Cited

U.S. PATENT DOCUMENTS 6,070,226 A    5/2000   Freeman et al.
6,716,102 B2   4/2004   Whitten et al.
(Continued)

OTHER PUBLICATIONS

ISA European Patent Office, International Search Report & Written Opinion for Patent Application No. PCT/US2013/072413, Feb. 13, 2014, 10 Pages.
(Continued)

*Primary Examiner* — Yaima Rigol
*Assistant Examiner* — Glenn Gossage
(74) *Attorney, Agent, or Firm* — Aaron Chatterjee; Dan Choi; Micky Minhas

(57) ABSTRACT

A computing device includes a primary content storage machine configured to selectively store one or more content portions of a digital content item, such as game portions of a video game. The computing device is configured to determine a size of a dynamically changing content access window including one or more content portions usable to provide an above-threshold user experience, such as uninterrupted game play, based on a current access position of the digital content item or video game and historical user-specific play patterns or game play consumption rates of different users. The computing device is configured to dynamically load the primary content storage machine with the content portions or game portions corresponding to the content access window and dynamically unload the content or game portions outside of the content access window from the primary content storage machine.

19 Claims, 3 Drawing Sheets

(51) Int. Cl.
*G06F 12/00* (2006.01)
*A63F 13/00* (2014.01)
*G06F 3/06* (2006.01)
*A63F 13/67* (2014.01)
*G06F 12/08* (2016.01)

(52) U.S. Cl.
CPC .............. *G06F 2212/6024* (2013.01); *G06F 2212/6042* (2013.01)

(56) References Cited

U.S. PATENT DOCUMENTS

| | | |
|---|---|---|
| 7,039,695 B1 | 5/2006 | DeLuca et al. |
| 7,681,246 B1 | 3/2010 | Chen |
| 7,951,008 B2 * | 5/2011 | Wolf et al. ............... 463/43 |
| 8,078,583 B2 | 12/2011 | Prahlad et al. |
| 2004/0005928 A1 | 1/2004 | Eguchi et al. |
| 2004/0008767 A1 | 1/2004 | Ueda et al. |
| 2007/0136533 A1* | 6/2007 | Church et al. ............ 711/137 |
| 2007/0254742 A1* | 11/2007 | O'Brien .................... 463/42 |
| 2009/0112975 A1* | 4/2009 | Beckman et al. ......... 709/203 |
| 2009/0300144 A1* | 12/2009 | Marr et al. ................ 709/219 |
| 2009/0300642 A1 | 12/2009 | Thaler et al. |
| 2010/0137046 A1 | 6/2010 | Kataoka et al. |
| 2012/0005172 A1 | 1/2012 | Kataoka et al. |

OTHER PUBLICATIONS

Arneson, D.A, "Development of Omniserver", Retrieved at http://ieeexplore.ieee.org/stamp/stamp.jsp?tp=&arnumber=113575>>, Digest of Papers. Tenth IEEE Symposium on Mass Storage Systems. Crisis in Mass Storage, May 7, 1990, pp. 88-93.

* cited by examiner

DYNAMIC CONTENT ACCESS WINDOW LOADING AND UNLOADING

BACKGROUND

Typical computing devices, such as video game consoles, include a finite amount of native (e.g., internal) storage. As digital content items increase in size, the amount of individual content items that can be loaded onto the native storage similarly decreases. Accordingly, frequent management of the storage is typically employed to ensure that a particular content item is loaded and accessible when desired.

SUMMARY

Embodiments are disclosed for presenting a digital content item comprising a plurality of content portions. One example embodiment includes a computing device comprising a primary content storage machine, where the primary content storage machine is configured to selectively store one or more content portions of a digital content item. The computing device further comprises a logic machine configured to determine a dynamically changing content access window including one or more content portions usable to provide an above-threshold user experience based on a current access position of the digital content item. The logic machine is further configured to dynamically load the primary content storage machine with the content portions of the digital content item corresponding to the content access window and dynamically unload the content portions of the digital content item outside of the content access window from the primary content storage machine.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
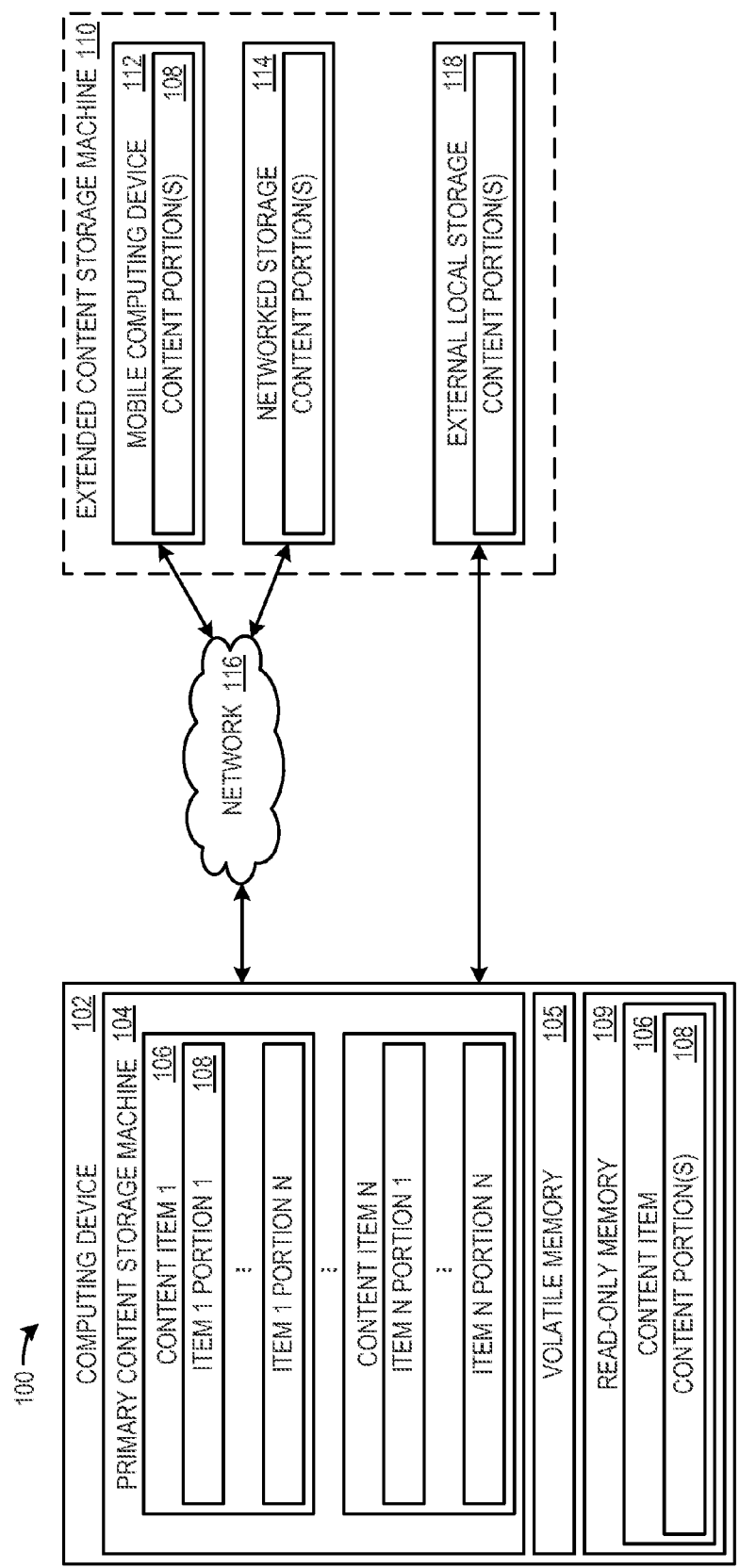
FIG. 1 shows an example use environment for presenting a digital content item.

Typical computing devices include a native storage machine usable to store applications, digital content, and the like. Once a content item (e.g., video game) is loaded onto such devices, the content item remains loaded, independent of a user's progression, access frequency, etc. As the size of such an internal or native storage machine is typically finite and non-expandable, a user may be expected to actively manage the storage. For example, when installing new content items, existing data may be removed so as to provide suitable storage space for the new content item. As content continues to expand in size, the frequency with which such decisions are made may increase, thereby potentially providing an unsuitable user experience. For example, in some scenarios, a user may be forced to uninstall content even if such content has not been fully experienced. Thus, the user may have to reinstall the previously-uninstalled content item before being able to continue experiencing the content item. Such a process may be time-consuming, thereby raising a barrier of entry and potentially decreasing a likelihood the user will access the content item again.

Thus, some typical computing devices are further configured to utilize external storage (e.g., Universal Serial Bus (USB) devices, Network Attached Storage "NAS," etc.) for increasing the amount of available storage. However, such external storage is typically slower than native (e.g., internal) storage and, in some scenarios, may be unusable for playback. For example, some video game consoles may be configured such that video games are not playable via external devices due to various considerations (e.g., security, low throughput, protocol incompatibility, etc.).

Regardless of whether or not extra storage is available, it will be appreciated that a relatively small percentage of a particular content item is typically required at any given time in order to provide an above-threshold user experience of the content item. For example, as media content is typically accessed in a linear or otherwise predictable fashion, only information near a current access (playback) position may be needed in order to sustain an above-threshold (e.g., full-quality) user experience. In other words, in the case of a song or movie, information corresponding to a few minutes before and after the current access position may be sufficient to ensure uninterrupted playback, as it is possible that a user may briefly fast-forward or rewind during media playback while maintaining substantially linear access. In the case of a level-based video game, information corresponding to the game engine, a current level or scene, and the next level or scene may be sufficient to ensure uninterrupted playback. It is to be understood that the "current" access position may be the position that was last accessed before access was suspended (e.g., playback session ended and playback was stopped).

As such, it may be unnecessary to acquire information unlikely to be accessed in the near feature (e.g., levels or scenes of a game that have already been experienced or are not likely to be experienced next), and thus such information may not be acquired until playback progresses farther. Generally speaking, it may be desirable to acquire portion(s) of a digital content item that are more likely to be accessed to ensure that such content portions are available in order to avoid interruptions to the user experience. Similarly, it may be desirable to remove content portions that are less likely to be accessed (e.g., portions that have already been accessed) in order to decrease an amount of storage space used. Accordingly, embodiments are disclosed that relate to dynamic loading of content portions of digital content items. Embodiments are further disclosed relating to dynamically unloading of unused content portions and potentially loading the unused content portions onto extended storage device(s) for future retrieval, if desired.

An example embodiment of a use environment 100 is described with reference to FIG. 1. Environment 100 includes computing device 102 (e.g., gaming device, media device, etc.) comprising non-volatile primary content storage machine 104 (e.g., hard drive, solid state memory, etc.) and volatile memory 105. Primary content storage machine 104 may be configured for long-term storage of one or more digital content items 106, illustrated as an arbitrary number N of digital content items 106. Each digital content item comprises a plurality of content portions 108, illustrated as an arbitrary number N of content portions 108 for each content item 106. Although each digital content item is illustrated as comprising N number of content portions, it will be understood that each digital content item 106 may comprise any one or more content portions 108.

Each digital content item 106 may represent any suitable type of digital content, including but not limited to interactive content such as video games, interactive video, and social media. Other examples include, but are not limited to, movies, television shows and other videos, music, photo libraries, etc. Likewise, content portions 108 may take any suitable form. For example, content portions 108 may take the form of specific portions of memory (e.g. memory locations, disk sectors, etc.), or, by extension, specific data, files, etc.

Primary content storage machine 104 may provide relatively fast access to content portion(s) 108 of digital content items 106, and it may therefore be desirable to ensure that the content portions likely to be loaded into volatile memory 105 are stored on the primary content storage machine. Volatile memory 105 may be configured, for example, to "buffer" content portions 108 during presentation of the digital content item. However, as primary content machine 104 is typically finite, it will be appreciated that it may be desirable to dynamically load the primary content storage machine with content portions 108 on an "as-needed" basis. In other words, primary content storage machine 104 may store content portions 108 usable to provide an above-threshold (e.g., substantially uninterrupted) user experience, and additional content portions 108 may be acquired as access (e.g., game play, content playback, etc.) progresses.

Generally speaking, computing device 102 may be configured to dynamically acquire content portion(s) 108 for presenting a particular digital content item 106. For example, in some scenarios, content portions 108 of digital content item 106 may be acquired from read-only memory 109 (e.g., optical disc) and buffered via volatile memory 105. However, such a scenario may be potentially inconvenient since typical read-only memories store a single content item 106, as illustrated. Additionally, when presentation of a different content item is desired, the existing read-only memory 109 (e.g., disc, cartridge, etc.) must be removed from the computing device, and new read-only memory must be introduced, thereby potentially increasing the time and/or effort in experiencing new content items 106.

In other scenarios, content portions 108 from read-only memory 109 may be loaded onto primary content storage machine 104, thus enabling future accesses of the content portions via the primary content storage machine. However, such a scenario may result in the entirety of a particular content item 106 being loaded onto the primary content storage machine, which may utilize an unacceptable amount of installation time and/or an unacceptable amount of space on the primary content storage machine.

As another example, in some embodiments, content portions 108 may be loaded onto the primary content storage machine by acquiring the content portions from networked storage 114 (e.g., Network Attached Storage (NAS), cloud storage service, etc.) via network 116. As another example, computing device 102 may be configured to acquire content portion(s) from external local storage 118 (e.g., USB storage device) communicatively coupled to the computing device via one or mechanisms other than network 116. It will be appreciated that networked storage 114 and local storage 118 are presented for the purpose of example, and computing device 102 may be configured to selectively acquire content portions 108 from any one or more sources without departing from the scope of the present disclosure.

In addition to dynamically loading primary content storage machine 104 with content portion(s) 108, it may be further desirable to ensure that content portions 108 that are not usable to provide the above-threshold user experience are not loaded onto the primary content storage machine, so as to free space for other content portions that are more likely to be accessed. For example, content portion(s) 108 that are not likely to be accessed (e.g., previously accessed, etc.) may be unloaded from the primary content storage machine without impacting the above-threshold experience. Thus, in some embodiments, computing device 102 may be configured to dynamically unload such "unneeded" content portions. However, as some digital content items 106 may be re-accessed in the future, it will be appreciated that it may be desirable to "archive" such unneeded content portions in anticipation of future accesses.

In order to provide such archiving, use environment 100 further includes extended content storage machine 110 usable to store archived content portions 108. In other words, computing device 102 may "virtually extend" the amount of available storage beyond that offered by primary content storage machine 104. In the example environment 100, extended storage machine 110 comprises a plurality of discrete storage devices and services, such as mobile computing device 112 (e.g., mobile phone, etc.) and remote networked storage 114 communicatively coupled to computing device 102 via network 116. In some embodiments, as illustrated, extended content storage machine 110 may further include external local storage 118 communicatively coupled to computing device 102 via one or more mechanisms (e.g., USB, Peripheral Component Interconnect (PCI), memory card interface, etc.) other than network 116. It will be understood that the illustrated configuration of extended content storage machine 110 is presented for the purpose of example, and the extended content storage machine may include any suitable number and configuration of devices, services, etc. communicatively coupled to computing device 102 via any suitable mechanism and/or combination of mechanisms without departing from the scope of the present disclosure.

Regardless of the specific configuration of extended content storage machine 110, the extended content storage machine may be configured to store one or more content portions 108 of any one or more digital content items 106. Content portions 108 loaded onto extended content storage machine 110 may sometimes be referred to herein as "archived" content portions so as to provide differentiation from the content portions stored via the primary content storage machine. However, it will be appreciated that such terminology is not intended to denote transformation (e.g., compression, etc.) of content portions 108 upon loading onto the extended content storage machine. It will be understood that content portions 108 may be acquired from, though not archived to, devices and/or services (e.g., read-only memory 109) other than the devices and services of extended content storage machine 110.

However, it will be appreciated that it may be desirable to acquire content portions 108 not presently loaded onto the primary content storage machine from the extended content storage machine 110, as opposed to acquiring the content portions from one or more other sources. For example, as mentioned above, in order to acquire content portions 108 from read-only memory 109, an optical disc or other medium is typically physically introduced to the computing device. Thus, when switching from one content item 106 to another, read-only memory 109 must be physically replaced, thereby further increasing the barrier to experience the new content item. In addition, utilization of read-only memory 109 may be slower than the extended storage device, may be more disruptive (e.g., noisier due to reading of an optical disc), and/or may otherwise result in an unsatisfactory user experience.

In some embodiments, computing device 102 may enable configuration of extended content storage machine 110, and such configuration may be provided for each device of the extended content storage machine and/or for the extended content storage machine as a whole. For example, a user may be able to specify, via interaction with computing device 102, what percentage of the extended content storage machine, and/or what percentage of each composite device of the extended content storage machine, is usable to receive the archived content portions. For example, a user may desire that only a portion of networked storage 114 (e.g., 100 Gigabytes (GB)) is usable to store the archived content portions. Configuration may further include selecting a preferred storage device such that archived content portions are preferentially archived to, and/or retrieved from, the preferred storage device. In some embodiments, such configuration may be performed manually, whereas such configuration may be substantially programmatic in other embodiments. For example, in some embodiments, computing device 102 may be configured to measure performance of each device of the extended content storage machine, and preference may thus be given to devices exhibiting better performance.

In order to provide interaction with extended content storage machine 110, computing device 102 may be configured to understand what content portions 108 are archived via extended content storage machine 110. Information regarding what portion(s) are archived may be gathered and maintained by computing device 102 and/or extended content storage machine 110, so long as such information is accessible to computing device 102. Using such information, computing device 102 may be configured to acquire the content portion(s) from the extended content storage machine, as will be described in greater detail below.

The loading of archived content portions may be manually effected via a user input (e.g., user selection of a particular content item) and/or may be accomplished substantially programmatically (e.g., upon device startup, upon introduction of a saved video game state file, etc.). In some embodiments, computing device 102 and/or extended content storage machine 110 may be configured to acquire content portion(s) 108 associated with a particular archived content item, thereby ensuring that a greater subset (e.g., all) of the content portions of the archived content item are available via the extended content storage machine 110 in the future. Such acquisition may occur, for example, in the background and/or during periods of low network traffic, etc., so as to not interfere with the loading of content portions onto the primary content storage machine. It will be understood that these scenarios are presented for the purpose of example, and are not intended to be limiting in any manner.

In some embodiments, the computing device may be configured to programmatically archive digital content items 106 and/or content portions 108 thereof that have not been accessed for a particular amount of time (e.g., 30 days). In other embodiments, computing device 102 may be configured to determine a statistical likelihood that a particular content portion is to be accessed, and may further programmatically archive content portions that are unlikely to be accessed. Such a likelihood metric may be determined, for example, by monitoring device usage patterns of computing device 102, monitoring usage patterns for each digital content item 106 and/or across a plurality of digital content items 106, utilizing aggregated monitoring information relating to usage of a content item by a plurality of different users, and/or via additional mechanisms.

Upon determining what content items 106 are available via primary content storage machine 104 and/or extended content storage machine 110 (i.e., archived content items), computing device 102 may be configured to present a user with information (e.g., via one or more graphical user interfaces) regarding such content items 106. For example, computing device 102 may present a list or other graphical element(s) indicating what content item(s) 106 are available for presentation. In some embodiments, there may be no differentiation between archived content items and content items including content portions loaded onto the primary content storage machine. In other embodiments, the archived content items may be differentiated (e.g., via an asterisk or other visual cue) from the content items loaded onto the primary content storage machine. As acquiring content portions 108 from the extended content storage machine may be slower than acquiring the content portions from the primary content storage machine, such differentiation may help the user to decide which digital content item 106 to experience. For example, a user wishing to experience a digital content item 106 with a minimal wait time may decide to acquire a digital content item loaded onto primary content storage machine 104 over an archived digital content item.

In some embodiments, differentiation of the archived content items may be at least partially based on a digital content item type. For example, since presentation of non-interactive digital content items (e.g., movies, music, etc.) may be relatively linear, may require less throughput, etc., such non-interactive digital content items loaded onto extended content storage machine 110 may not be differentiated from digital content items stored via primary content storage machine. It will be appreciated that these scenarios are presented for the purpose of example, and are not intended to be limiting in any manner. It will further be appreciated that archiving of digital content items 106 may be determined and/or specified on a game-by-game basis, a device-by-device basis, and/or according to any other suitable granularity.

Since some digital content items 106 (e.g., video games) may take hours, days or even weeks to complete, only a subset of the content portions 108 may be needed at any given time in order to provide an above-threshold experience, as briefly mentioned above. For example, in some video games, a user typically transitions from region to region (e.g., levels) and rarely, if ever, returns to the beginning of the game. Accordingly, as a user progresses through such a level-based video game, previously-completed levels (i.e., one or more content portions 108) may be unloaded from computing device 102 and, in some scenarios, may be loaded onto extended content storage machine 110.

Figure 2A:
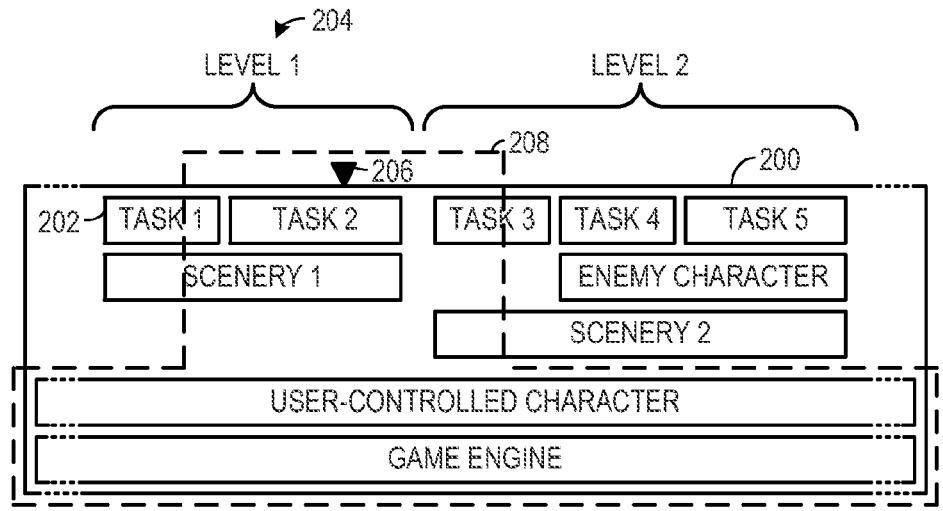
FIGS. 2A-2B schematically show an example of a content item comprising a plurality of content portions.

Turning now to FIG. 2A, digital content item 200 in the form of a video game and including a plurality of content portions 202 is schematically illustrated. Specifically, digital content item 200 is illustrated as including two levels 204, where each level corresponds to one or more content portions 202. It will be understood that content portions 202 are illustrated to elucidate a temporal relationship between the content portions for the ease of understanding, and the illustrated size of the content items are not intended to suggest a position and/or size of each content portion 202 within digital content item 200. For example, the user-controlled character content portion is illustrated as spanning the entirety of content item 200, thereby indicating that content portions(s) 202 corresponding to the user-controlled character may be utilized during the entirety of a presentation of content item 200. In other words, content portions corresponding to the game engine and the user controlled character may be loaded onto a primary content storage machine (e.g., primary content storage machine 104) upon request of digital content item 200 and may remain loaded until digital content item 200 is fully unloaded. As another example, enemy character content portion 202 is illustrated as being positioned near the end of level 2, thereby indicating that such enemy character content portion is encountered at the end of level 2. Accordingly, such a content portion may not be loaded onto the primary content storage machine until a user progresses towards the end of level 2 in some embodiments. As mentioned above, it will be understood that a particular content item may comprise any one or more content portions without departing from the scope of the present disclosure.

When presenting digital content item 200 (e.g., media content playback, user-interactive game play, etc.), such presentation corresponds to a varying current access position 206 (e.g., current frame, game "position," etc.). In some scenarios, the current access position may correspond to a saved state (e.g., via saved state file, network-accessible user profile, etc.), thereby indicating a position from where presentation of the digital content item is to be restarted. Accordingly, the presenting computing device may be configured to determine, based on current access position 206, dynamically varying content access window 208 corresponding to one or more content portions 202. As used herein, the term "content access window" refers to a subset of content portions 202 of a digital content item 200 usable to maintain an above-threshold experience. In other words, although the example content access window is illustrated as spanning a plurality of temporally-contiguous content portions, it will be appreciated that the content window may include any one or more content portions. It will be further appreciated that the content access window may not necessarily be localized about the current access position. Generally speaking, the content access window may be determined based on the current access position regardless of a nature of progression (e.g., substantially linear, substantially open-ended, etc.) through the digital content item.

For example, progression through a particular digital content item (e.g., a role-playing video game) may be described via a tree or any other statistically deterministic path. In this way, the content window may include one or more content portions corresponding to one or more branches of the tree. In other words, given a current position within a virtual environment of the video game, there may exist a probability that various content portions (e.g., other environments, characters, items, etc.) may be accessed in the future, and therefore the content access window may be determined to include the one or more content portions likely to be accessed. For example, as a user-controlled character approaches a virtual town, the content access window may be determined to include one or more content portion(s) describing the town.

In some scenarios, the content access window may correspond to a particular time period of content access (e.g., 4 hours) about the current access position. In other scenarios, the content access window of a level-based video game may correspond to a current level, a current scene, and/or game aspects accessible from a current position.

It will be appreciated that the illustrated content portions 202 are situated according to one potential access pattern (e.g., a "standard" access pattern). In other words, although there typically exists a temporal relationship between individual content portions 202 (e.g., succession of frames of a video content item, levels in a video game, etc.), the order in which the content portions are accessed may vary between accesses. For example, one user may spend significant time retracing their steps in order to ensure that all tasks are completed for a given level 204, whereas other users may complete the bare minimum of tasks in order to complete the level. Accordingly, it will be appreciated that it may be desirable to anticipate future access requests to ensure that content portions 202 corresponding to such request are loaded onto the primary content storage machine (i.e., by dynamically varying the size and/or scope of content access window 208), so as to provide an above-threshold experience.

In other words, the computing device may be configured to dynamically acquire content portions 202 corresponding to content access window 208 (e.g., content portions 202 likely to be accessed) that are usable to maintain the user experience, thereby potentially resulting in only a very small percentage of overall content portions 202 ever being loaded onto a primary content storage machine at any given time. For example, the presenting computing device may determine that, upon user progression from level 1 to level 2, it is unlikely that the user may re-access the "Task 1" content portion 202 associated with level 1. Accordingly, once a decision has been made that such a previously-accessed content portion is no longer likely to be accessed, the computing device may programmatically remove the content portion from the primary content storage machine (e.g., primary content storage machine 104). Similarly, some content portions 202 may be determined to be "unreachable" based on the current access position, and such content portions may be unloaded in response. In some embodiments, the computing device may be configured to archive such content portions 202 in anticipation of future accesses, as mentioned above and as will be discussed in greater detail below.

Figure 2B:
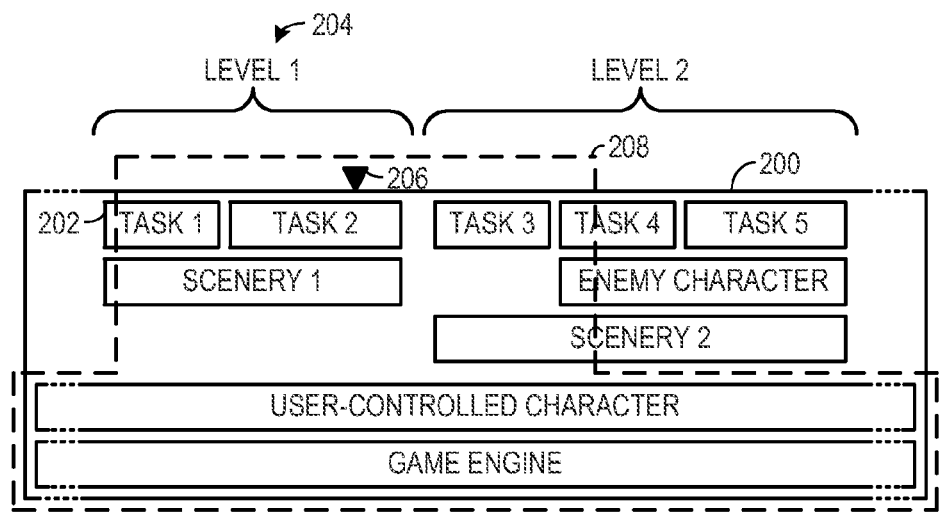

Turning briefly to FIG. 2B, digital content item 200 is illustrated having content access window 208 that is larger than the content access window of FIG. 2A. The content access window may vary in scope according to various considerations, including, but not limited to, network bandwidth, processor load, storage machine throughput, digital content item type, statistical information, historical user-specific play patterns, and the like. For example, a user that rushes through levels quickly may begin level 2 shortly after beginning level 1. As such, a greater percentage of level 2 may be loaded for this type of player than the type of player that slowly progresses through levels.

Figure 3:
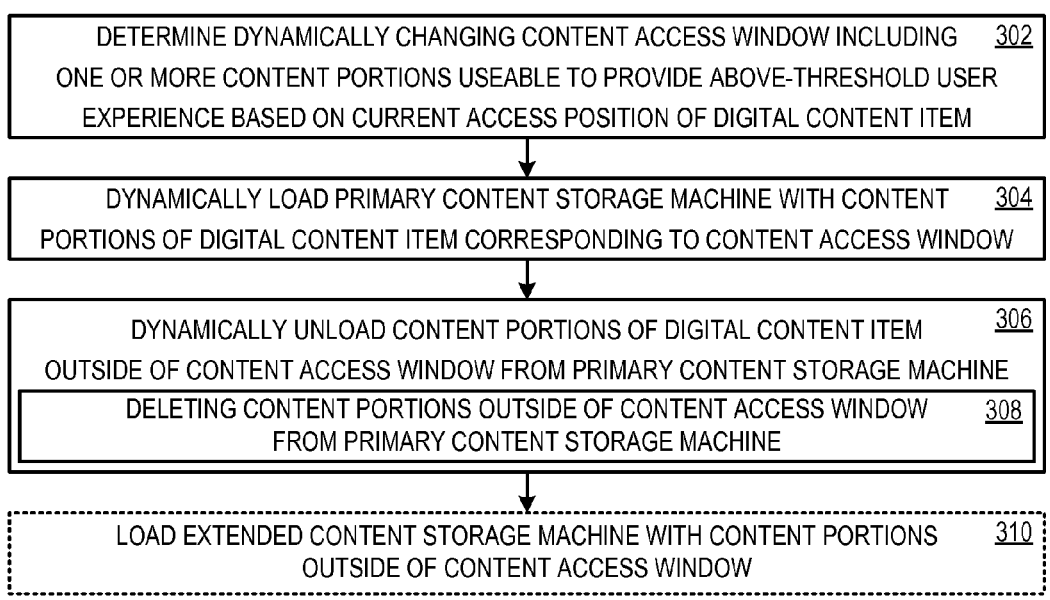
FIG. 3 shows a process flow depicting an embodiment of a method for presenting a digital content item according to an embodiment of the present disclosure.

Turning now to FIG. 3, an example embodiment of a method 300 for presenting a digital content item is illustrated. At 302, method 300 comprises determining a dynamically changing content access window (e.g., content access window 208) including one or more content portions usable to provide an above-threshold user experience based on a current access position of the digital content item. The content access window may correspond, for example, to one or more content portions that are likely to be accessed. As briefly mentioned above, the content access window may be determined according to various mechanism(s).

For example, as mentioned above, determining the content access window may include utilizing dynamically-calculated and/or pre-calculated decisions about the statistical likelihood that a user may encounter a particular portion of a user experience. It will be appreciated that each interactive digital content item (e.g., video game) will vary greatly with respect to the relationships between individual experiences (e.g., whether levels are accessible from a current access position), and therefore which experiences are "likely" to be experienced may vary from content item to content item. Accordingly, it may be desirable to obtain information regarding the progression for each digital content item. For example, in some embodiments, the digital content item may include information regarding such progression. In other embodiments, each content portion may include metadata indicating a particular user experience (e.g., level) provided by the content portion.

Given knowledge of a user's current access position 206 (e.g., position in a video game), a consumption rate (e.g., the rate of progression through the video game), and/or other consumption statistics (e.g., game play "style"), the computing device may be configured to determine content access window 208 usable to provide the above-threshold user experience. In other words, using such information, it may be possible to ensure that the amount of content (i.e., content portions) installed on the primary content storage machine at any one time is a function of the high probability user experiences that are reachable based on the current access position (e.g., N degrees of separation from the current user experience).

In some embodiments, statistics may be collected and/or determined based on previous access(es) of one or more digital content items in order to determine the content access window. Based on these statistics, the likelihood that one or more user experiences (e.g., levels) may be selected is able to be determined. For example, a user that typically rushes through a video game without completing ancillary tasks may effect a large content access window since a greater number of content portions may be accessed within a given amount of time. Similarly, a user that is known to skip around a non-interactive digital content item (i.e., frequently skips scenes when watching a movie) may effect a larger content access window than a user that experiences such content items in a substantially linear fashion.

In some embodiments, determining the content access window may comprise utilizing one or more mapping mechanisms in order to determine what content portions correspond to a particular access position (e.g., room, level, region, map, etc.). Similarly, such mapping may be usable to determine what content portions are needed to sustain the above-threshold experience. In other embodiments, each content portion may include metadata usable to determine what is represented by the content portion. With knowledge of the individual content portions, the content access window may be determined such that the content access window corresponds to a particular time period or other metric of content access about the current access position. For example, the content access window may be sized to provide 4 hours of substantially uninterrupted game play from the current access position.

At 304, method 300 further comprises dynamically loading a primary content storage machine with the content portions of the digital content item corresponding to the content access window. As mentioned above, the content items may be loaded from any suitable source or combination of sources (e.g., local optical drives, memory cards, USB devices, network attached storage, mobile computing devices, etc.). In some embodiments, the content portions may be acquired from an extended content storage machine (e.g., extended content storage machine 110 of FIG. 1). In such embodiments, the content portions may be loaded from the extended content storage machine even if the content portions are available from one or more other sources. Generally speaking, the sources may be prioritized, either programmatically and/or manually (e.g., according to latency, network bandwidth, local vs. remote, etc.), with the content portions being acquired from the higher-priority sources, when possible.

As mentioned above, one or more mapping mechanisms may be utilized to determine a relationship between a given content access window and one or more content portions. Utilizing such information, loading the content portions corresponding to the content access window may enable, for example, restarting of a partially-completed experience of a digital content item. For example, a user may be able to load a saved game state on a computing device, and the computing device may be able to acquire one or more content portion(s) so as to enable resuming from the saved game state, even if the primary content storage machine of the computing device is not presently, and/or has never been, loaded with the content portion(s). For example, briefly returning to the example of FIG. 2A, a user that has previously experienced digital content item 200 may possess a saved game state information (e.g., one or more saved game files) corresponding to level 2 of the digital content item. The user may be able to restart the experience from the same computing device and/or a different computing device (e.g., video game console of a friend) by introducing the saved game state information to the computing device. Thus, upon determining a current access position 206 corresponding to level 2, content portions 202 corresponding to level 2 may be acquired programmatically. Furthermore, content portions 202 corresponding to level 1 may not be acquired if it is unlikely that the user may progress backwards. In other words, even in such restart scenarios, only the content portions 202 usable to provide an above-threshold experience are loaded and/or remain loaded on the primary content storage machine.

At 306, method 300 further comprises dynamically unloading the content portions of the digital content item outside of the content access window from the primary content storage machine. For example, utilizing the above-mentioned statistics, content portions that are no longer likely to be accessed as a user progresses through the digital content item may be unloaded from the primary content storage machine. However, it will be appreciated from the above discussion that the unloading of content portions may be effected manually or programmatically, and/or according to various considerations, without departing from the scope of the present disclosure. For example, in some embodiments, digital content items and/or portions thereof may be unloaded from the primary content storage based on recency of use, frequency of use, and/or additional metrics.

It will be further appreciated that "unloading," in some embodiments, may comprise marking the storage space associated with the unloaded content portions as available, whereas in other embodiments, unloading may comprise deleting, at 308, the content portions (e.g., effecting one or more delete operations) that are outside of the content access window from the primary content storage machine.

As described above, an extended content storage machine may be available in some embodiments so as to enable archiving of such content portions. Accordingly, at 310, method 300 may further comprise loading the extended content storage machine with the content portions outside of the content access window (i.e., archiving content portions). By archiving content portions, such content portions may remain available for future accesses while decreasing the amount of space utilized on the primary content storage machine.

In some embodiments, the methods and processes described herein may be tied to a computing system of one or more computing devices. In particular, such methods and processes may be implemented as a computer-application program or service, an application-programming interface (API), a library, and/or other computer-program product.

Figure 4:
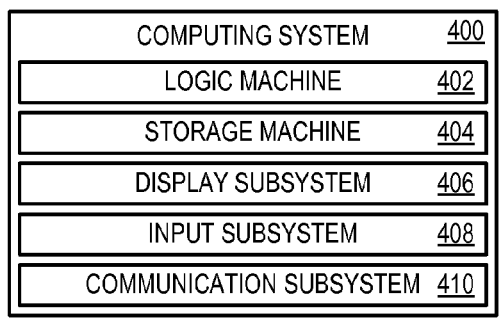
FIG. 4 schematically shows an example computing system according to an embodiment of the present disclosure.

FIG. 4 schematically shows a non-limiting embodiment of a computing system 400 that can enact one or more of the methods and processes described above. Computing system 400 is shown in simplified form. Computing device 102, mobile computing device 112, and networked storage 114 are non-limiting examples of computing system 400. Computing system 400 may take the form of one or more game consoles, personal computers, server computers, tablet computers, home-entertainment computers, network computing devices, mobile computing devices, mobile communication devices (e.g., smart phone), and/or other computing devices.

Computing system 400 includes logic machine 402 and storage machine 404. Computing system 400 may optionally include a display subsystem 406, input subsystem 408, communication subsystem 410, and/or other components not shown in FIG. 4.

Logic machine 402 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 404 includes one or more physical devices configured to hold instructions executable by the logic machine to implement the methods and processes described herein. When such methods and processes are implemented, the state of storage machine 404 may be transformed—e.g., to hold different data.

Storage machine 404 may include removable and/or built-in devices. Storage machine 404 may include optical memory (e.g., compact disc (CD), digital versatile disc (DVD), high definition-DVD (HD-DVD), BLU-RAY Disc, etc.), semiconductor memory (e.g., random access memory (RAM), erasable programmable read only memory (EPROM), electrically erasable programmable read only memory (EEPROM), etc.), and/or magnetic memory (e.g., hard-disk drive, floppy-disk drive, tape drive, magneto-resistive random access memory (MRAM), etc.), among others. Storage machine 404 may include volatile, nonvolatile, dynamic, static, read/write, read-only, random-access, sequential-access, location-addressable, file-addressable, and/or content-addressable devices.

It will be appreciated that storage machine 404 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 402 and storage machine 404 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

It will be appreciated that a "service", as used herein, is an application program executable across multiple user sessions. A service may be available to one or more system components, programs, and/or other services. In some implementations, a service may run on one or more server-computing devices.

When included, display subsystem 406 may be used to present a visual representation of data held by storage machine 404. This visual representation may take the form of a graphical user interface (GUI). As the herein described methods and processes change the data held by the storage machine, and thus transform the state of the storage machine, the state of display subsystem 406 may likewise be transformed to visually represent changes in the underlying data. Display subsystem 406 may include one or more display devices utilizing virtually any type of technology. Such display devices may be combined with logic machine 402 and/or storage machine 404 in a shared enclosure, or such display devices may be peripheral display devices.

When included, input subsystem 408 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 410 may be configured to communicatively couple computing system 400 with one or more other computing devices. Communication subsystem 410 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 400 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing device, comprising:
a primary content storage machine, the primary content storage machine configured to selectively store one or more game portions of a video game; and
a logic machine configured to:
determine a size of a dynamically changing content access window including one or more game portions usable to provide an above-threshold user experience based on a current access position of the video game and historical user-specific play patterns such that a relatively larger size of the content access window is determined for users that consume game play relatively faster, and a relatively smaller size of the content window is determined for users that consume game play relatively slower;
dynamically load the primary content storage machine with the one or more game portions of the video game corresponding to the content access window;
determine which previously loaded game portions of the video game are outside of the content access window based on a statistical likelihood that those game portions are less likely to be accessed; and
dynamically unload the game portions of the video game outside of the content access window from the primary content storage machine.

2. The computing device of claim 1, where the logic machine is further configured to delete the game portions of the video game outside of the content access window from the primary content storage machine.

3. The computing device of claim 1, further comprising an extended content storage machine, where the logic machine is further configured to load the extended content storage machine with the game portions of the video game outside of the content access window.

4. The computing device of claim 3, where the logic machine is further configured to specify how much of the extended content storage machine is usable to load the game portions of the video game outside of the content access window.

5. The computing device of claim 3, where the extended content storage machine includes a plurality of discrete content storage machines, where the logic machine is further configured to selectively load one or more of the discrete content storage machines with the game portions of the video game outside of the content access window.

6. The computing device of claim 3, where the logic machine is configured to dynamically load the primary content storage machine with the game portions of the video game corresponding to the content access window by acquiring game portions from the extended content storage machine.

7. The computing device of claim 1, where the primary content storage machine is a non-volatile content storage machine.

8. The computing device of claim 1, where the content access window includes a minimum set of game portions determined to provide the above-threshold user experience.

9. The computing device of claim 1, where the content access window corresponds to a particular time period of content access about the current access position.

10. The computing device of claim 1, where the logic machine is configured to selectively vary a size of the content access window.

11. A method for presenting a video game comprising a plurality of game portions, the method comprising:
determining a size of a dynamically changing content access window including one or more game portions usable to provide an above-threshold user experience based on a current access position of the video game and historical user-specific play patterns such that a relatively larger size of the content access window is determined for users that consume game play relatively faster, and a relatively smaller size of the content window is determined for users that consume game play relatively slower;
dynamically loading a primary content storage machine with the one or more game portions of the video game corresponding to the content access window;
determining which previously loaded game portions of the video game are outside of the content access window based on a statistical likelihood that those game portions are less likely to be accessed; and
dynamically unloading the game portions of the video game outside of the content access window from the primary content storage machine.

12. The method of claim 11, further comprising deleting the game portions of the video game outside of the content access window from the primary content storage machine.

13. The method of claim 11, further comprising loading an extended content storage machine with the game portions of the video game outside of the content access window.

14. The method of claim 13, further comprising specifying how much of the extended content storage machine is usable to load the game portions of the video game outside of the content access window.

15. The method of claim 13, further comprising selectively loading one or more of a plurality of discrete content storage machines of the extended content storage machine with the game portions of the video game outside of the content access window.

16. The method of claim 13, further comprising dynamically loading the primary content storage machine with the game portions of the video game corresponding to the content access window by acquiring game portions from the extended content storage machine.

17. The method of claim 11, where the primary content storage machine is a non-volatile content storage machine.

18. The method of claim 11, where the content access window includes a minimum set of game portions determined to provide the above-threshold user experience.

19. The method of claim 11, where the content access window corresponds to a particular time period of content access about the current access position.

* * * * *